US012594951B2

(12) United States Patent
Tsimhoni et al.

(10) Patent No.: US 12,594,951 B2
(45) Date of Patent: Apr. 7, 2026

(54) AUDIBLE CUE SYSTEM FOR A VEHICLE

(71) Applicant: GM Global Technology Operations LLC, Detroit, MI (US)

(72) Inventors: Omer Tsimhoni, Bloomfield Hills, MI (US); Song He, Troy, MI (US); Frank C. Valeri, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 7 days.

(21) Appl. No.: 18/661,531

(22) Filed: May 10, 2024

(65) Prior Publication Data

US 2025/0346244 A1    Nov. 13, 2025

(51) Int. Cl.
B60Q 3/40    (2017.01)
B60W 50/14    (2020.01)
G08B 21/24    (2006.01)

(52) U.S. Cl.
CPC ............. B60W 50/14 (2013.01); G08B 21/24 (2013.01); B60W 2050/143 (2013.01)

(58) Field of Classification Search
USPC ....... 340/438, 439, 441, 443, 431, 466, 477, 340/488, 506, 516, 539.21–539.23, 568.1
See application file for complete search history.

(56) References Cited

U.S. PATENT DOCUMENTS 5,463,554 A * 10/1995 Araki ................. G01C 21/3667
                                                              340/995.19
6,256,561 B1 * 7/2001 Asanuma ............... B62D 1/286
                                                              701/72

| 10,628,644 B2 * | 4/2020 | Lee ..................... G06K 7/10316 |
| 2016/0001781 A1 * | 1/2016 | Fung ......................... G07C 9/37 |
| | | 701/36 |
| 2019/0385057 A1 * | 12/2019 | Litichever ............... H04L 63/14 |
| 2021/0075800 A1 * | 3/2021 | Paraskevas ......... H04L 63/1441 |
| 2022/0100853 A1 * | 3/2022 | Gehrer ................... G06F 21/56 |

FOREIGN PATENT DOCUMENTS

| DE | 10056756 A1 | 5/2002 |
| DE | 102013210056 A1 | 12/2014 |
| DE | 102023113063 A1 | 11/2024 |
| GB | 2513394 A | 10/2014 |

* cited by examiner

*Primary Examiner* — Daniel Previl

(74) *Attorney, Agent, or Firm* — Honigman LLP; Matthew H. Szalach; Jonathan P. O'Brien

(57)    ABSTRACT

An audible cue system for a vehicle includes data processing hardware and memory hardware in communication with the data processing hardware. The memory hardware stores instructions that when executed on the data processing hardware cause the data processing hardware to perform operations including receiving, at a first electronic control unit (ECU), one or more vehicle data points, executing, by the first ECU, an audible cue application configured with a positive cue and cue characteristics, and comparing the one or more vehicle data points with a cue range. The operations also include outputting, based on the comparison of the one or more vehicle data points with the cue range, the positive cue of the audible cue application via a speaker system of the vehicle, monitoring the one or more vehicle data points, and modifying the positive cue based on the monitored one or more vehicle data points.

20 Claims, 7 Drawing Sheets

AUDIBLE CUE SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to an audible cue system for a vehicle.

Vehicles may be equipped with various alert systems or warning signals to notify a driver of a preset limit of the vehicle. For example, the vehicle controller may be configured with a limit that may alert the driver when the vehicle exceeds the preset limit. The vehicle controller generally reserves alerts or other audible notifications to alert the driver of a potential error, issue, or surpassing of any potential preset limit. Thus, the driver does not receive positive feedback associated with driving patterns or other vehicle related data.

SUMMARY

In some aspects, an audible cue system for a vehicle includes data processing hardware and memory hardware in communication with the data processing hardware. The memory hardware stores instructions that when executed on the data processing hardware cause the data processing hardware to perform operations including receiving, at a first electronic control unit (ECU), one or more vehicle data points, executing, by the first ECU, an audible cue application configured with a positive cue and cue characteristics, and comparing the one or more vehicle data points with a cue range stored in the memory hardware. The operations also include outputting, based on the comparison of the one or more vehicle data points with the cue range, the positive cue of the audible cue application via a speaker system of the vehicle, monitoring the one or more vehicle data points, and modifying the positive cue based on the monitored one or more vehicle data points.

In some examples, outputting the positive cue may include outputting, continuously, the positive cue when the one or more vehicle data points are within the cue range. Optionally, modifying the positive cue may include altering at least one of the cue characteristics, the positive cue including a first audible pattern. The operations may also include issuing a reminder in response to the monitored one or more vehicle data points, the reminder including a positive reminder cue having a second audible pattern. In some instances, issuing the reminder may include identifying a trend relative to the cue range and issuing the reminder when the identified trend is trending towards the cue range. The second audible pattern may be faster than the first audible pattern. In other instances, outputting the positive cues may include increasing a volume of the positive cue at a first rate to a predetermined volume. Optionally, modifying the positive cue includes decreasing the volume of the positive cue at a second rate, the second rate being greater than the first rate.

In other aspects, a computer-implemented method when executed by data processing hardware causes the data processing hardware to perform operations. The operations include receiving, at a first electronic control unit (ECU), one or more vehicle data points, executing, by the first ECU, an audible cue application configured with a positive cue and cue characteristics, comparing the one or more vehicle data points with a cue range, and outputting, based on the comparison of the one or more vehicle data points with the cue range, the positive cue from the audible cue application via a speaker system of the vehicle. The operations also include monitoring the one or more vehicle data points and modifying the positive cue based on the monitored one or more vehicle data points.

In some examples, outputting the positive cue may include outputting, continuously, the positive cue when the one or more vehicle data points are within the cue range. Optionally, modifying the positive cue may include altering at least one of the cue characteristics, the positive cue including a first audible pattern. The operations may also include issuing a reminder in response to the monitored one or more vehicle data points, the reminder including a positive reminder cue having a second audible pattern. In some instances, issuing the reminder may include identifying a trend relative to the cue range and issuing the reminder when the identified trend is trending towards the cue range. The second audible pattern may be faster than the first audible pattern. In other instances, outputting the positive cues may include increasing a volume of the positive cue at a first rate to a predetermined volume. Optionally, modifying the positive cue includes decreasing the volume of the positive cue at a second rate, the second rate being greater than the first rate.

In further aspects, an audible cue system for a vehicle includes data processing hardware and memory hardware in communication with the data processing hardware. The memory hardware stores instructions that, when executed on the data processing hardware, cause the data processing hardware to perform operations. The operations include receiving, at a first electronic control unit (ECU), one or more vehicle data points and executing, by the first ECU, an audible cue application configured with a positive cue and cue characteristics. The operations also include comparing the one or more vehicle data points with a cue range stored in the memory hardware and outputting, based on the comparison of the one or more vehicle data points with the cue range, the positive cue from the audible cue application via a speaker system of the vehicle.

In some examples, the operations may also include monitoring the one or more vehicle data points and modifying the positive cue based on the monitored one or more vehicle data points. The operations may also include issuing a reminder in response to the monitored one or more vehicle data points being outside of the cue range. Optionally, the one or more vehicle data points may include at least one of a speed of the vehicle, a state of charge of a battery, environmental controls of the vehicle, power usage of the battery, acceleration of the vehicle, deceleration of the vehicle, gravitational force of the vehicle in at least one direction, and a following distance of the vehicle.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
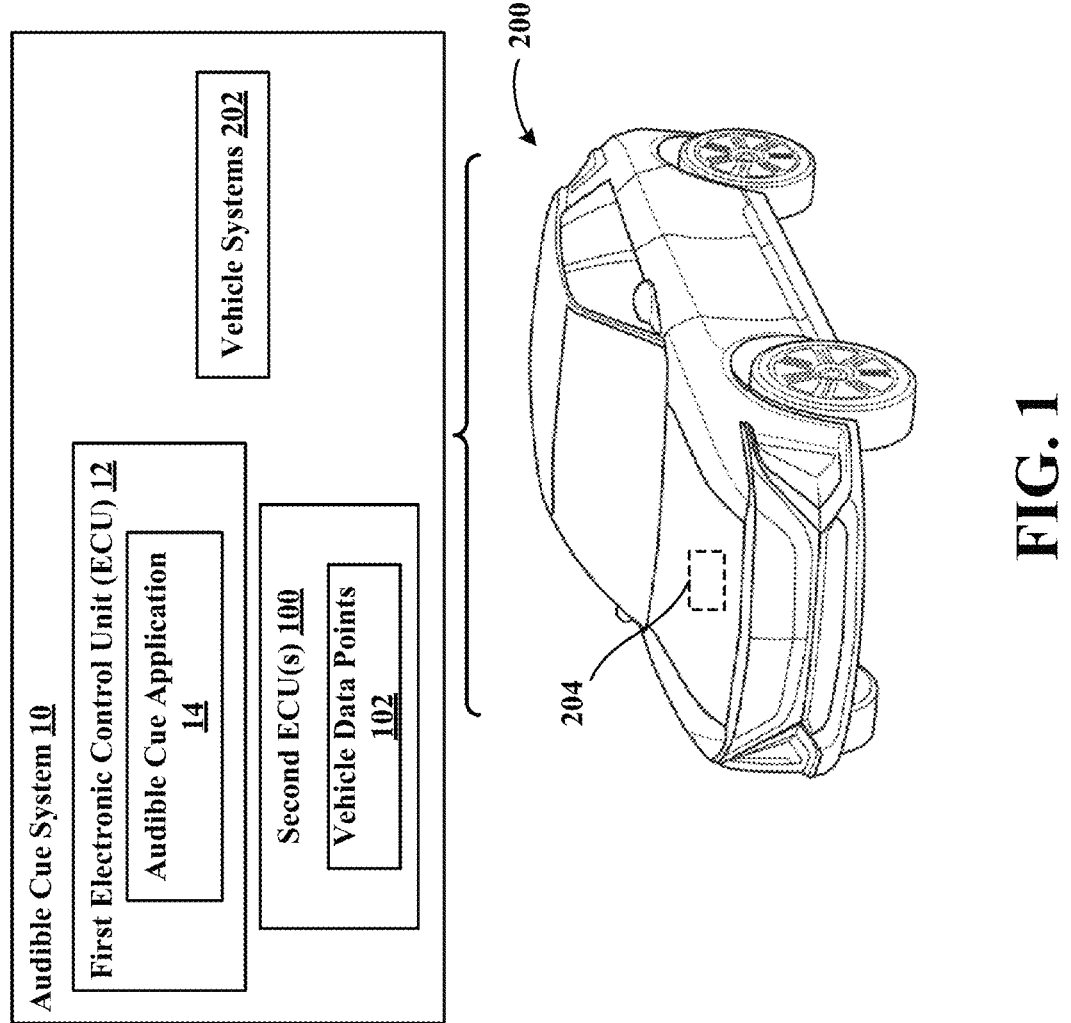
FIG. 1 is a schematic view of a vehicle equipped with an audible cue system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
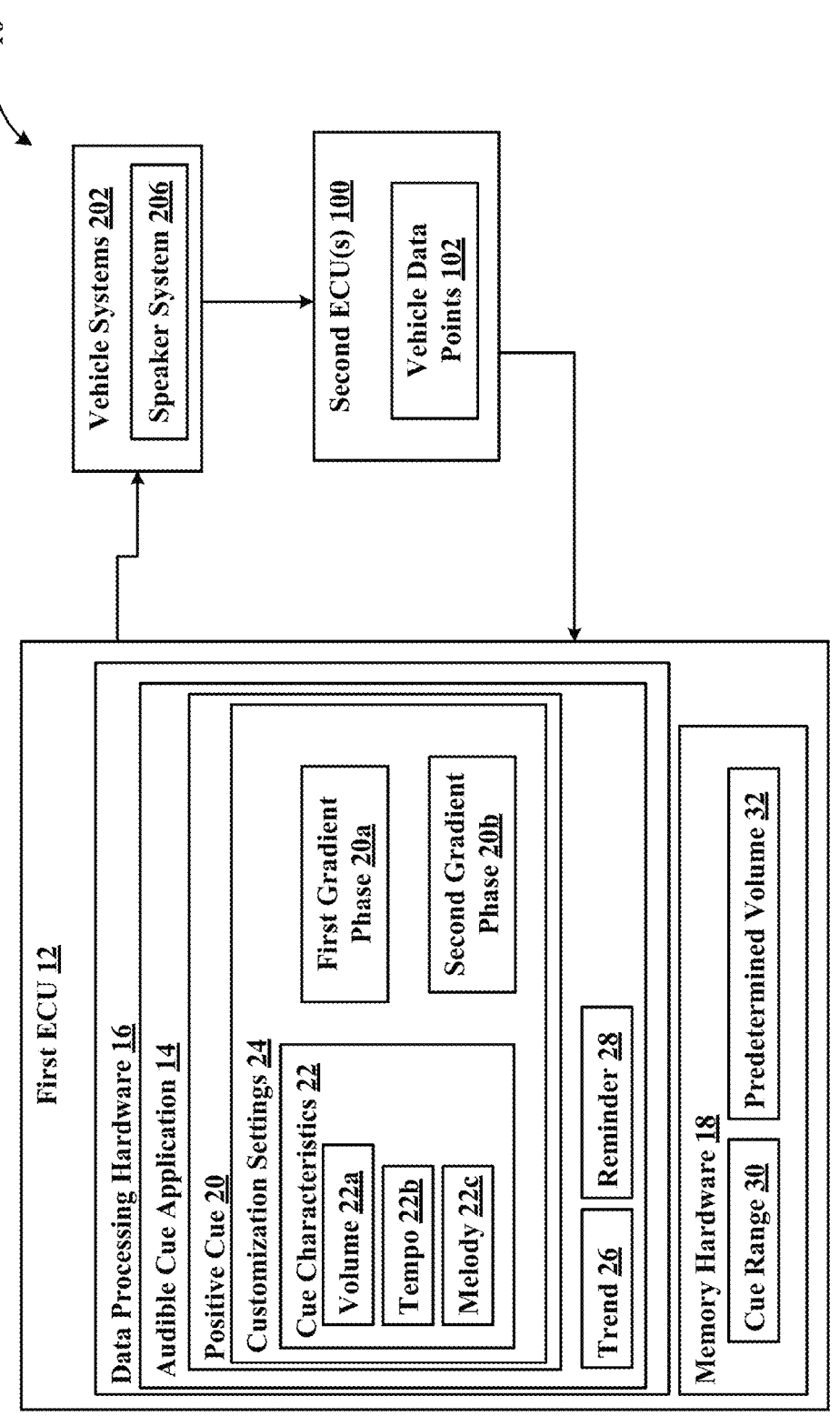
FIG. 2 is an example block diagram of an audible cue system according to the present disclosure.

Referring to FIGS. 1 and 2, an audible cue system 10 includes a first electronic control unit (ECU) 12 configured with an audible cue application 14 and one or more second ECU(s) 100 in communication with the first ECU 12. The audible cue system 10 is configured as part of a vehicle 200 to facilitate positive driving patterns of a user via the audible cue application 14. For example, the audible cue application 14 is configured to provide guidance to the driver by utilizing positive, pleasant sounds, described herein. While the vehicle 200 may be equipped with the audible cue system 10, the vehicle 200 may also be equipped with other warning or alert systems that may assist in operating the vehicle 200 including, but not limited to, lane assist systems, front assist systems, and internal safety features. The vehicle 200 may be configured as an internal combustion engine (ICE) vehicle, an electric vehicle (EV), or as a hybrid vehicle. The audible cue system 10 may be configured to monitor various vehicle systems 202 and analyze vehicle data points 102 with respect to execution of the audible cue application 14. For example, the vehicle data points 102 may relate to performance and efficiency of a battery 204 of the vehicle 200 where the vehicle 200 is an EV.

The audible cue system 10 provides an interconnected system for the first ECU 12 to communicate with the second ECU 100 and respective vehicle systems 202 when determining whether to execute the audible cue application 14. The first ECU 12 includes data processing hardware 16 and memory hardware 18 in communication with the data processing hardware 16. The memory hardware 18 stores instructions that, when executed on the data processing hardware 16, cause the data processing hardware 16 to perform operations, described herein. The data processing hardware 16 is configured to execute the audible cue application 14 in response to a positive driving pattern. For example, the audible cue application 14 issues a positive cue 20 to indicate to the driver that the associated driving pattern is positive or desirable. The positive cue 20 may be a pleasing sound issued in response to the vehicle data points 102 received from the second ECU 100, which generally inform the driving pattern. However, the positive cue 20 is not limited to association with a driving pattern and may reflect general efficiencies of operation of the vehicle 200, mentioned below.

Referring to FIGS. 2-5, the second ECU 100 may include multiple ECUs including, but not limited to, a battery monitor ECU, a vehicle systems ECU, a motor control ECU, a sound system ECU, and a lighting ECU. The second ECU 100 may also control other systems including, but not limited to, a climate system, an infotainment system, and any other practicable system operable as part of the vehicle 200. The second ECU 100, thus, monitors the various vehicle systems 202 and communicates the corresponding vehicle data points 102 with the first ECU 12. In some examples, the first ECU 12 may correspond to an infotainment ECU, which is in communication with the other vehicle ECUs 100 and is configured to project the positive cue 20. The audible cue application 14 of the first ECU 12 utilizes the vehicle data points 102 received from the second ECU(s) 100 in determining whether to issue the positive cue 20.

The vehicle data points 102 include, but are not limited to, a speed of the vehicle, a state of charge of the battery 204 (FIG. 1) of the vehicle 200, environmental controls of the vehicle 200, power usage of the battery 204, acceleration of the vehicle 200, deceleration of the vehicle 200, gravitational force of the vehicle 200 in at least one direction, interior lighting, exterior lighting, and a following distance of the vehicle 200. The vehicle data points 102 inform a status of the vehicle 200 relative to the surrounding environment in addition to the internal vehicle systems 202. For example, the vehicle data points 102 may indicate that a current driving pattern corresponds to efficient driving, such that the first ECU 12 may issue the positive cue 20. The positive cue 20 may be issued via a speaker system 206 of the vehicle 200. As described herein, the vehicle systems 202 may include, but are not limited to, the speaker system 206, an infotainment system 208, a lighting system 210, and a cabin system 212.

With further reference to FIGS. 2-5, the audible cue application 14 is designed to provide information to the driver of the vehicle 200 that may otherwise go unnoticed or of which the driver may otherwise be unaware. In one non-limiting example, drivers may be generally unaware of driving habits that may contribute to overall efficiency of driving an electric vehicle 200. Thus, the audible cue application 14 assists to provide the positive cue 20 when the driver is exhibiting driving patterns that correlate to, for example, efficient driving. The positive cue 20 includes cue characteristics 22 configured to assist the driver in identifying a positive driving pattern and/or communicating information to the driver that may not otherwise be comprehended by the driver. For example, the cue characteristics 22 may assist in prolonging or advantageously operating the vehicle 200 in extending a life of the battery 204 or long term battery health by performing executions based on the positive cue 20 and the associated cue characteristics 22.

The cue characteristics 22 are configured as part of customization settings 24 of the positive cue 20 to provide the driver or user with the option to customize the positive cue 20, described below. For example, the positive cue 20 may communicate information pertaining to efficiency of a driving pattern as it pertains to the battery 204 of the vehicle 200. The cue characteristics 22 may include, but are not limited to, volume 22a, tempo 22b, and melody 22c and are designed to provide the driver with a pleasant audible indication that the driver is positively operating the vehicle 200. In other examples, the cue characteristics 22 may also include harmony, pitch, form, texture, rhythm, tonality, timbre, and/or dynamics. Thus, the cue characteristics 22 described herein are exemplary of the types of cue characteristics 22 that may be configured as part of the audible cue application 14.

For example, the volume 22a of the positive cue 20 is audible within an interior cabin of the vehicle 200 and may be configured to automatically adjust based on audio levels of the speaker system 206. In some examples, the first ECU 12 may be configured to adjust the volume 22a based on additional audio (i.e., music, podcasts, radio, etc.) that may be playing through the speaker system 206, such that the volume 22a may be set to correlate to a predetermined volume percentage of the speaker system 206. The positive cue 20 may be superimposed with audio from the speaker system 206. The positive cue 20 may thus be audible in combination with the audio from the speaker system 206 without overpowering the audio from the speaker system 206.

In other examples, the volume 22a of the positive cue 20 may be fixed relative to the speaker system 206, such that additional audio may be adjusted while the volume 22a of the positive cue 20 remains at a constant level. The driver may optionally customize the cue characteristics 22 via the audio cue application 14. For example, the customization settings 24 of the audible cue application 14 may be displayed on the infotainment system 208. In either example, the positive cue 20 is designed as a subtle cue, such that the driver is aware of the positive cue 20, but the positive cue 20 does not overpower the selected audio of the driver.

Referring still to FIGS. 2-5, the audible cue application 14 is configured to identify a trend 26 of the audible cue system 10 based on the vehicle data points 102. If the vehicle data points 102 indicate that the driving pattern falls along the trend 26, the audible cue application 14 may issue a reminder 28. The trend 26 is based on a cue range 30 stored in the memory hardware 18 and predefined by the audible cue system 10. If the vehicle data points 102 fall outside of a cue range 30 of the audible cue system 10, but are trending toward the cue range 30, then the audible cue application 14 will issue the reminder 28.

Figure 3:
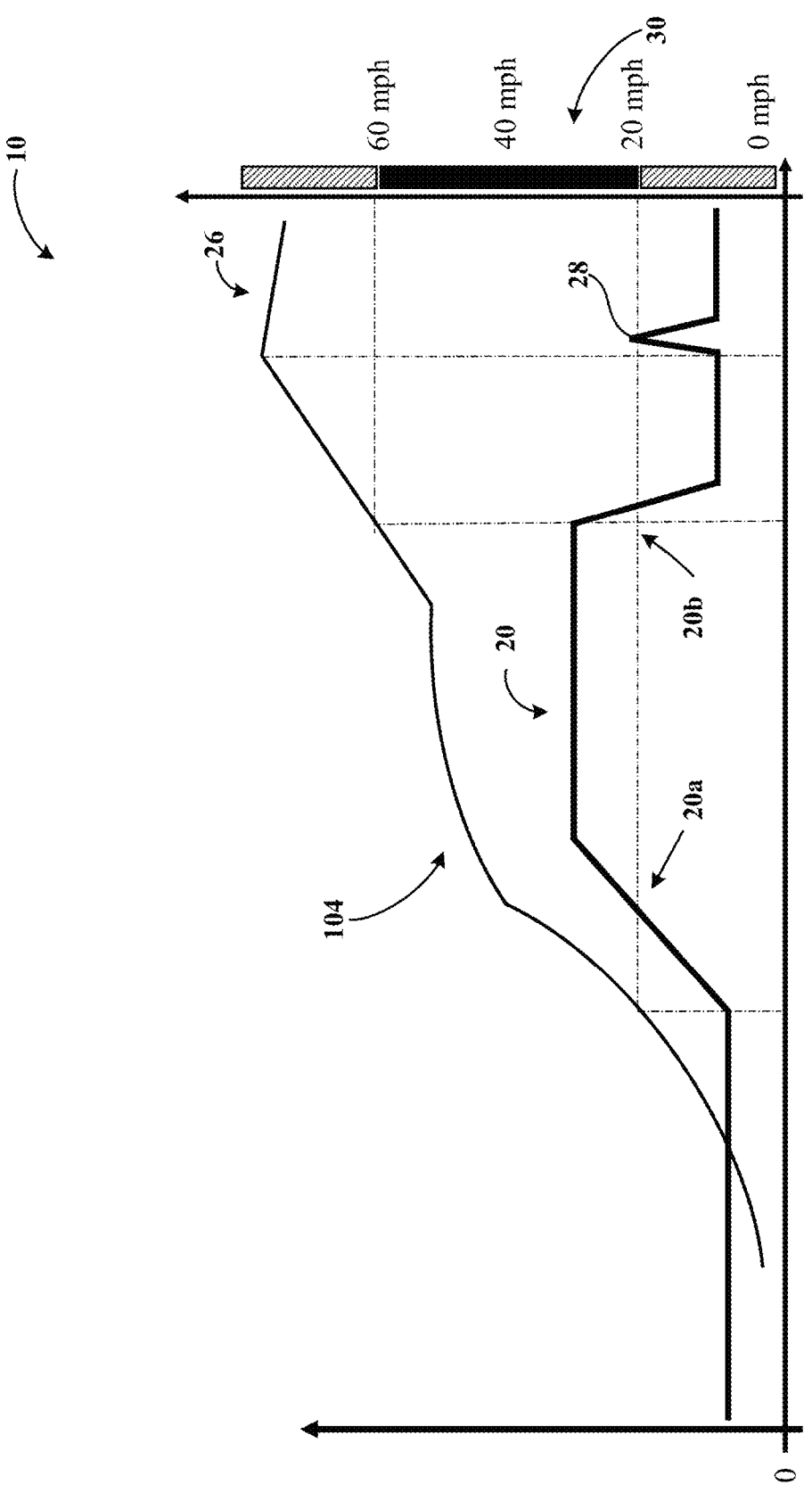
FIG. 3 is an exemplary graph of an audible cue system comparing a positive cue with vehicle data points.

The cue range 30 may be a predefined range that correlates with the vehicle data points 102. For example, the cue range 30 corresponding to a speed of the vehicle 200 as illustrated in FIG. 3, and the vehicle data points 102 may include driving data 104 that may include the speed of the vehicle 200. The audible cue application 14 may utilize the driving data 104 to determine whether to execute the positive cue 20 based on how the vehicle data points 102 are distributed relative to the cue range 30. When the vehicle data points 102 are within the cue range 30, the positive cue 20 is continuously projected and audible to the driver via the speaker system 206.

As described above, the positive cue 20 is configured as a pleasant and/or calm tone that is associated with positive feedback for the driver. As the driver operates the vehicle 200 within the cue range 30, the audible cue application 14 will execute the positive cue 20 to notify the driver that the vehicle 200 is being operated within the desired cue range 30. The audible cue application 14 is configured to execute the positive cue 20 along a gradient, such that the positive cue 20 is projected through the speaker system 206 gradually as the audible cue application 14 determines that the vehicle data points 102 fall within the cue range 30.

For example, the positive cue 20 includes a first gradient phase 20a and a second gradient phase 20b. The first gradient phase 20a is a gradual change in cue characteristic 22 (e.g., volume 22a) as the vehicle data points 102 trend toward and enter the cue range 30. For example, the positive cue 20 may be modified at a first rate corresponding to the first gradient phase 20a. In some examples, the volume 22a of the positive cue 20 may be increased at the first rate to a predetermined volume 32. It is contemplated that the first gradient phase 20a is configured to slowly or gradually generate or project the positive cue 20, while the second gradient phase 20b is configured to alert or otherwise notify the driver that the vehicle data points 102 are trending outside of the cue range 30 by sharply stopping the projection of the positive cue 20.

The second gradient phase 20b corresponds to the positive cue 20 being modified at a second, faster rate, as compared to the first rate during the first gradient phase 20a. For example, the audible cue application 14 rapidly decreases the volume 22*a* of the positive cue 20 when the vehicle data points 102 are outside of the cue range 30, and the lack of feedback (i.e., the positive cue 20) indicates to the driver that the vehicle 200 is being operated outside of a desired operative zone. The second rate corresponding to the second gradient phase 20*b* is greater or faster than the first rate corresponding to the first gradient phase 20*a*, such that the second rate is greater than the first rate. Thus, the second gradient phase 20*b* is designed to assist the driver in adjusting a driving pattern to stay within the cue range 30 by having a sharp change in the cue characteristic 22. In other words, the driver would learn that the positive cue 20 is provided at a desired operative zone for the vehicle 200.

In another non-limiting example, the tempo 22*b* of the positive cue 20 may be altered based on the first gradient phase 20*a* and the second gradient phase 20*b*. For example, the tempo 22*b* may gradually increase to a desired tempo corresponding to the positive cue 20 as the vehicle data points 102 trend towards and enter the cue range 30. If the vehicle data points 102 begin to trend away from the cue range 30, then the tempo 22*b* may change in a manner corresponding to the second gradient phase 20*b*. The change to the tempo 22*b* in the second gradient phase 20*b* may be to speed up the tempo 22*b* to clearly notify the driver of the change in vehicle data points 102 and, thus, driving pattern. Additionally or alternatively, the tempo 22*b* may rapidly slow to eliminate the positive cue 20.

FIG. 3 illustrates an exemplary graph of the audible cue system 10 with respect to driving data 104, corresponding to a speed of the vehicle 200, received from the second ECU 100. The cue range 30 is depicted as a range of speed (e.g., miles per hour) of the vehicle 200. When the vehicle 200 is traveling within the cue range 30, the audible cue application 14 is configured to execute the positive cue 20. The first gradient phase 20*a* is illustrated as a gradual projection of the positive cue 20 as the driving data 104 falls within the cue range 30, and the second gradient phase 20*b* is illustrated as a sharp termination of the positive cue 20 when the driving data 104 moves outside of the cue range 30. In general, the audible cue application 14 monitors the vehicle data points 102 to determine whether to modify the positive cue 20. Thus, when the vehicle 200 is operating outside of the cue range 30, the positive cue 20 is terminated.

The audible cue application 14 is configured to alter the cue characteristic(s) 22 of the positive cue 20 to a greater degree with respect to the second gradient phase 20*b* as compared to the first gradient phase 20*a*. For example, the first gradient phase 20*a* may slowly introduce the positive cue by gradually increasing the volume 22*a*, gradually altering the tempo 22*b*, and/or gradually adjusting the melody 22*c* to achieve the predefined positive cue 20. Comparatively, the second gradient phase 20*b* is designed to have a sharp or otherwise sudden change in cue characteristic(s) 22 of the positive cue 20, such that the driver may easily associate a change in the driving data 104 with the change in positive cue 20. For example, the second gradient phase 20*b* is illustrated in FIG. 3 as a sharp reduction of the positive cue 20, associated with the driving data 104 moving outside of the cue range 30.

In some instances, the audible cue application 14 may identify a trend 26 toward the cue range 30 and, thus, may issue a reminder 28. The reminder 28 is triggered based on the vehicle data points 102 and the trend 26. For example, as illustrated in FIG. 3, the first ECU 12 may detect that the trend 26 of the driving data 104 is moving toward the cue range 30. As a result, the audible cue application 14 may issue the reminder 28 to encourage the driver to continue trending the driving data 104 toward the cue range 30. The reminder 28 is configured to execute a similar sound to the positive cue 20 to encourage and remind the driver of the positive association of maintaining the vehicle data points 102 within the cue range 30.

The reminder 28 may also be customized to be different from the positive cue 20, while maintaining a positive sound and association. For example, the positive cue 20 may have a first audible pattern 40 and the reminder 28 may have a second audible pattern 42. The audible patterns 40, 42 are designed to have distinct characteristics 22, 42 so the driver or user may easily identify and distinguish between the positive cue 20 and the reminder 28. The first audible pattern 40 may be configured using the customization settings 24 of the positive cue 20. The second audible pattern 42 may be configured via reminder characteristics 44 of the reminder 28. The second audible pattern 42 may be different than the first audible pattern 40, but may have similar characteristics 44 as the cue characteristics 22 of the positive cue 20. In some examples, the reminder characteristics 44 may be similar to the cue characteristics 22 to remind and encourage the driver to continue trending toward the cue range 30. However, in other examples, the second audible pattern 42 may be faster than the first audible pattern 40. Regardless, both of the positive cue 20 and the reminder 28 are designed to have a pleasant sound to encourage the driver to operate the vehicle 200 within the cue range 30.

Figure 4:
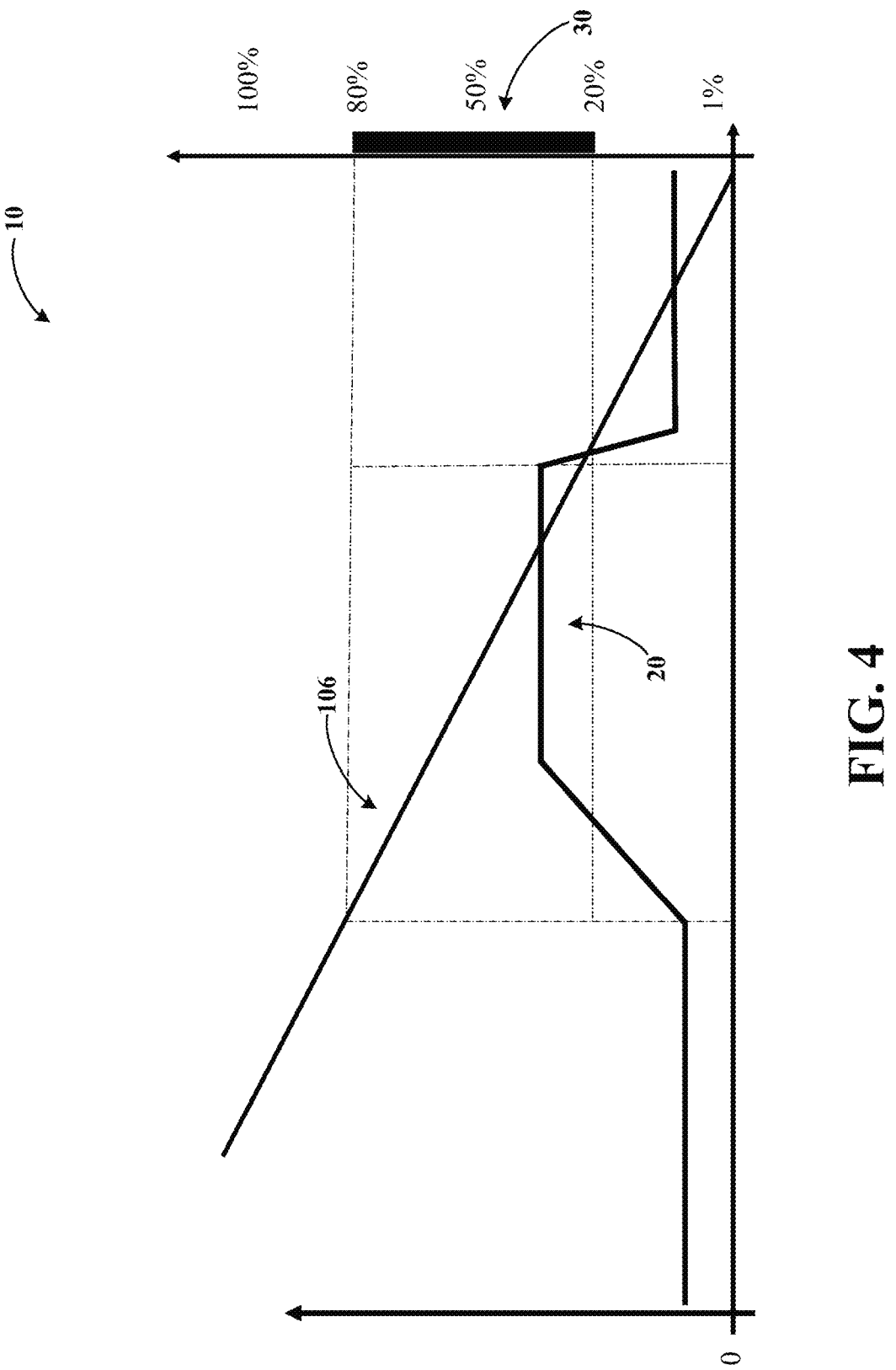
FIG. 4 is another exemplary graph of an audible cue system comparing a positive cue with vehicle data points.
Figure 5:
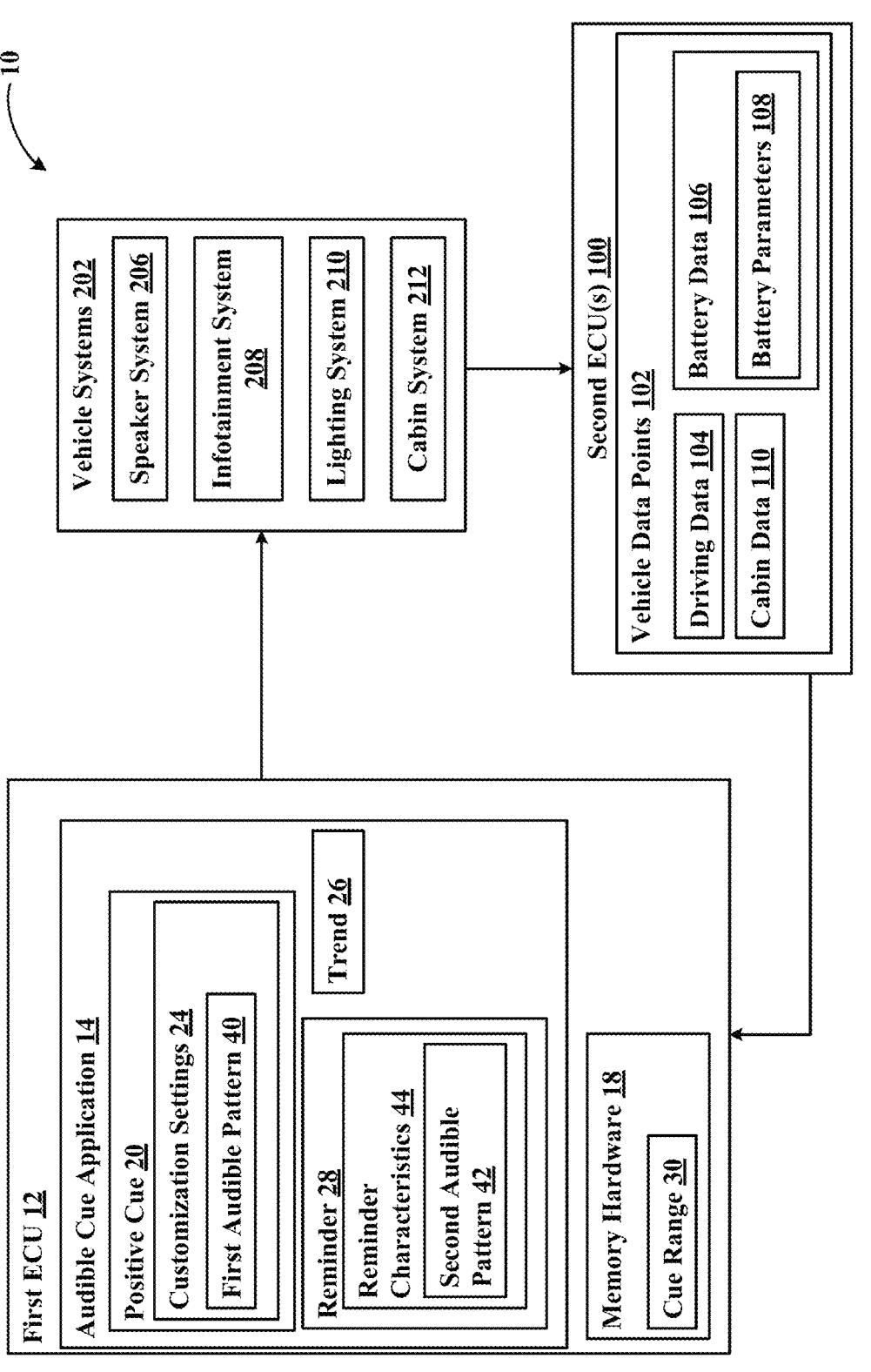
FIG. 5 is another example block diagram of the audible cue system.

Referring to FIG. 4, a graph corresponding to vehicle data points 102 associated with battery data 106 is illustrated as another example. The battery data 106 may include battery parameters 108 that are utilized by the audible cue application 14 to monitor the battery data 106 with respect to the cue range 30. For example, the battery parameters 108 may include, but are not limited to, a state of charge of the battery 204 and an efficiency of the driving pattern relative to life of the battery 204 (FIG. 1). The audible cue application 14 may monitor the battery data 106 during operation of the vehicle 200 and may notify the driver, via the positive cue 20, when an efficiency of the battery 204 is within the cue range 30. As illustrated in FIG. 4, the cue range 30 is defined as a percentage of the state of charge of the battery 204.

The audible cue system 10 may be utilized to extend the state of charge of the battery 204 by encouraging efficient driving patterns by setting the cue range 30 to correspond with a predetermined efficiency range. The audible cue application 14 may be utilized to identify the cue range 30, based on the battery data 106 and predetermined battery parameters 108 received from the second ECU 100. The second ECU 100 may modify or otherwise adjust the battery parameters 108 based on operation of the vehicle systems 202 and other vehicle data points 102. Thus, the battery data 106 may be dependent or otherwise affected by the vehicle data points 102 of each of the vehicle systems 202. For example, the vehicle systems 202 include cabin systems 212, such as heating and cooling systems, and the second ECU 100 may gather cabin data 110 related to the cabin systems 212. Depending on the operation of the cabin systems 212, as reflected by the cabin data 110, the audible cue system 10 may alter the cue range 30 to maximize the efficiency of the battery 204 of the vehicle 200.

With further reference to FIGS. 2-5, the audible cue application 14 may be configured to superimpose multiple positive cues 20 that relate to various aspects of the vehicle data points 102. In one non-limiting example, a first positive cue 20 may be associated with the battery data 106 and a second positive cue 20 may be associated with the driving data 104. In this example, the first positive cue 20 may be superimposed with the second positive cue 20 when the vehicle 200 is operated within the desired cue range 30 associated with the battery data 106 and the cue range 30 associated with the driving data 104. The first positive cue 20 may be distinct from the second positive cue 20 based on the cue characteristics 22 of each, such that the cue characteristics 22 may differ but may be harmonious to maintain the positive or pleasant audio experience of the positive cue 20.

Figure 6:
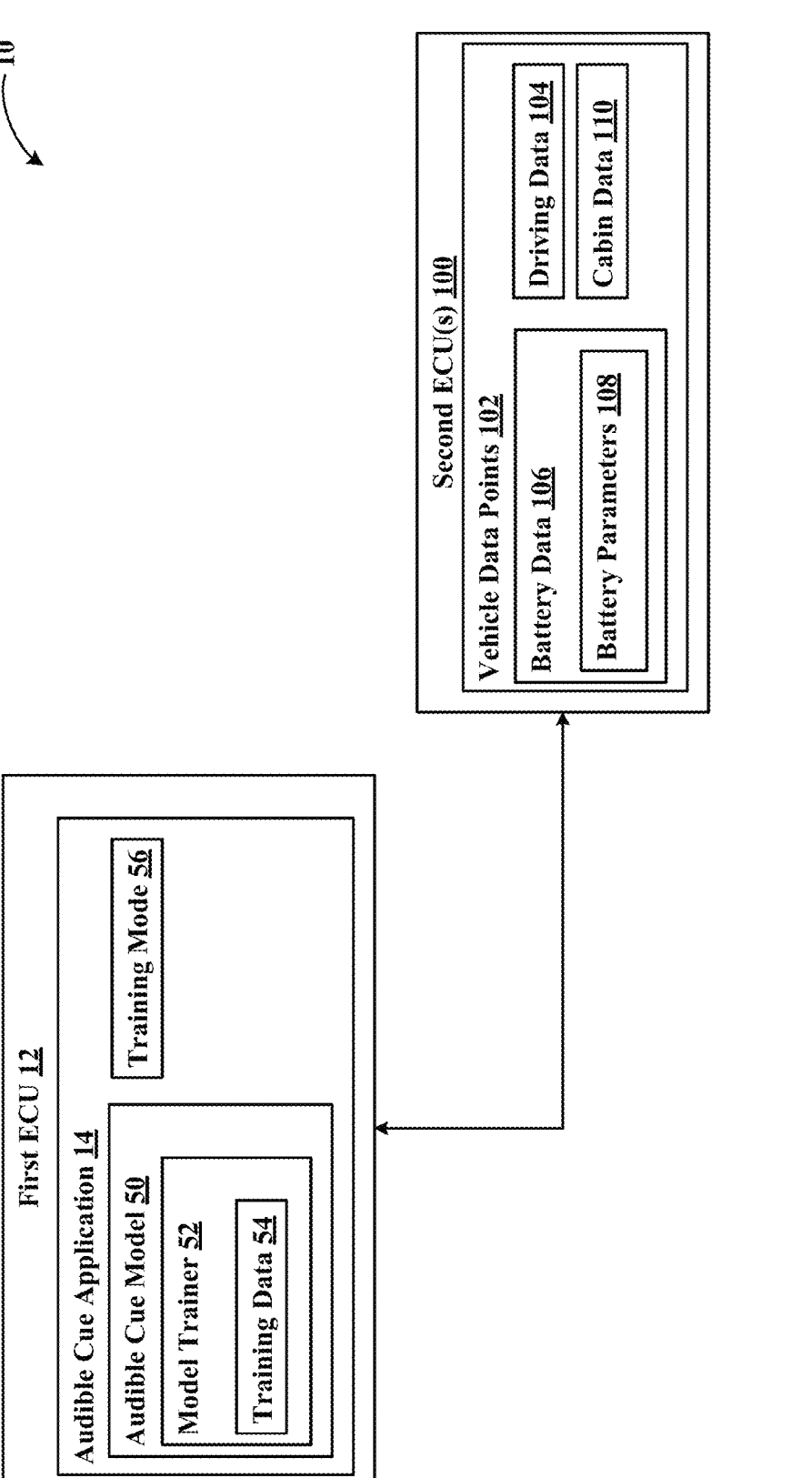
FIG. 6 is yet another example block diagram of the audible cue system.

With reference to FIG. 6, in some examples, the audible cue system 10 may include an audible cue model 50 configured with a model trainer 52. The model trainer 52 is configured to obtain training data 54 for training the audible cue model 50. The audible cue model 50 is configured as a machine learning model, such that the model trainer 52 is configured to train the machine learning model 50 based on the training data 54. The model trainer 52 may retrieve the training data 54 from, for example, the vehicle systems 202, such that the training data 54 includes, but is not limited to, the vehicle data points 102. The training data 54 may also include any type of data that the audible cue model 50 is trained to receive. For example, the training data 54 may include the battery data 106 and the driving data 104. The audible cue model 50 is trained to predict future cue ranges 30 based on the training data 54.

When executing the model trainer 52, the audible cue application 14 may enter a training mode 56. During the training mode 56, the audible cue application 14 may be inoperable to execute the positive cue 20, as the audible cue application 14 may be being trained by the model trainer 52 to identify the cue range 30. As the positive cue 20 is generally dependent upon the cue range 30, the model trainer 52 effectively determines when to execute the positive cue 20 during the training mode 56. In some examples, the audible cue application 14 may execute the audible cue model 50 and the training mode 56 at an initial set up of the vehicle 200, such that the cue range 30 is established on a front end of operation of the vehicle 200 based on the training data 54. In other examples, the audible cue application 14 may execute the training mode 56 at intervals to update the cue range 30 and improve the audible cue system 10 based on training data 54 that may be obtained during operation of the vehicle 200 (i.e., the vehicle data points 102).

Figure 7:
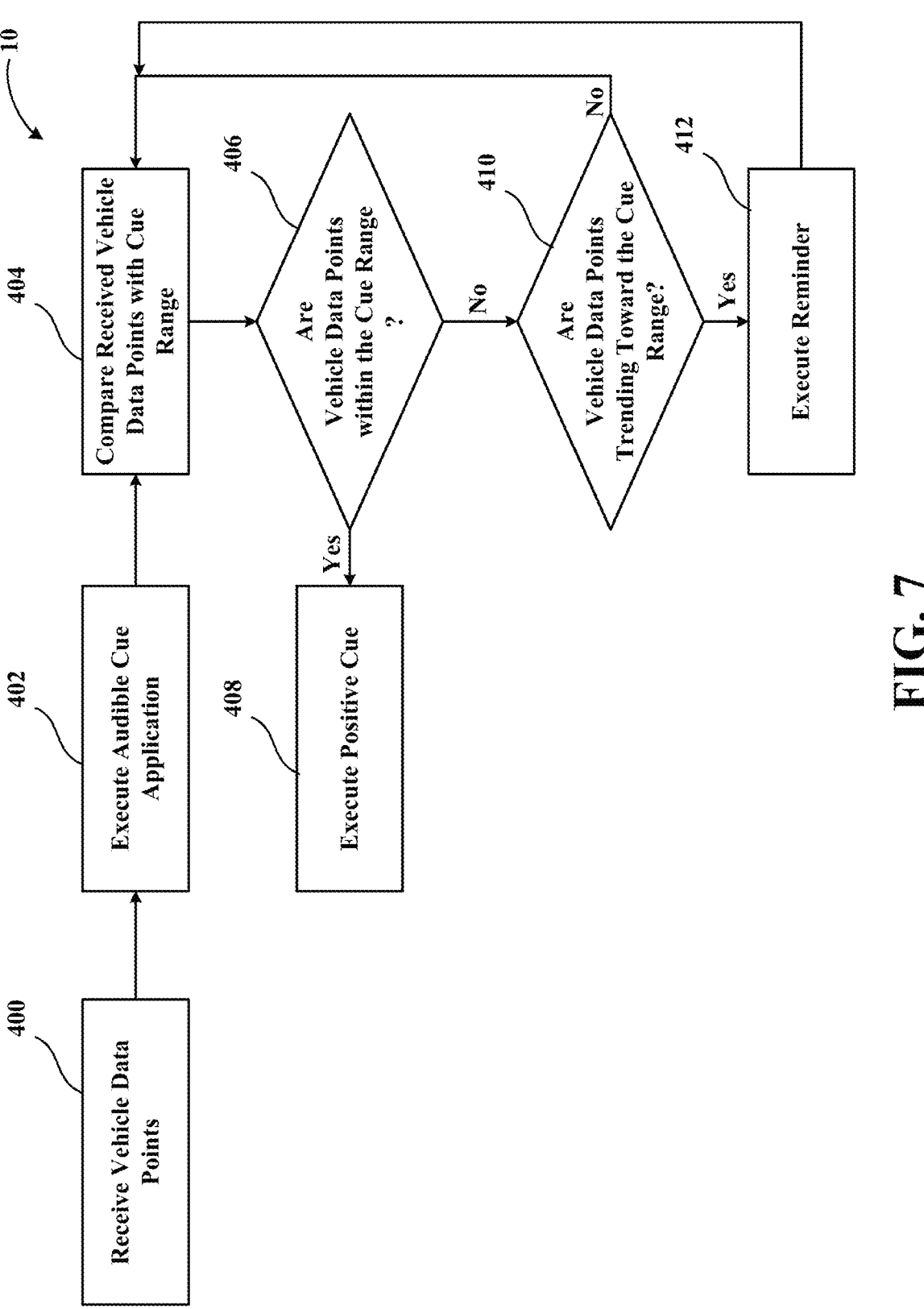
FIG. 7 is an example flow diagram of an audible cue system according to the present disclosure.

With reference to FIG. 7, an example flow diagram of the audible cue system 10 is illustrated. At 400, the first ECU 12 receives the vehicle data points 102 and executes, at 402, the audible cue application 14. The vehicle data points 102 are then compared with the cue range 30, at 404. The first ECU 12 determines, at 406, whether the vehicle data points 102 are within the cue range 30. If the vehicle data points 102 are within the cue range 30, then the audible cue application 14 executes, at 408, the positive cue 20.

If the vehicle data points 102 are not within the cue range 30, then the first ECU 12 determines, at 410, whether the vehicle data points 102 are trending toward the cue range 30. If the vehicle data points 102 are trending toward the cue range 30, then the audible cue application 14 executes, at 412, the reminder 28. Once the reminder 28 is executed, the audible cue application 14 returns to comparing the vehicle data points 102 with the cue range 30 to monitor whether to execute the positive cue 20. Similarly, if the audible cue application 14, via the first ECU 12, determines that the vehicle data points 102 are not trending toward the cue range 30, then the audible cue application 14 will not execute the reminder 28 and will continue comparing the vehicle data points 102 with the cue range 30.

Referring again to FIGS. 1-7, the audible cue system 10 assists in directing and encouraging positive driving patterns by providing a positive cue 20 to the driver during operation of the vehicle 200. The positive cue 20 is advantageously determined within a cue range 30 that optimizes performance of the vehicle 200. The audible cue application 14 is automatically enabled as part of the first ECU 12. However, the driver may adjust the cue settings 00 to modify cue parameters 00 and/or disable the audible cue application 14. Further, the audible cue system 10 may leverage machine learning through the audible cue model 50 of the audible cue application 14 for initial training and set up of the audible cue system 10. In addition, the audible cue system 10 may also leverage the audible cue model 50 for future or additional training of the audible cue system 10 based on the training data 54 gathered during operation of the vehicle 200.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An audible cue system for a vehicle, the audible cue system comprising:
data processing hardware; and
memory hardware in communication with the data processing hardware, the memory hardware storing instructions that when executed on the data processing hardware cause the data processing hardware to perform operations comprising:
receiving, at a first electronic control unit (ECU), one or more vehicle data points;
executing, by the first ECU, an audible cue application configured with a positive cue and cue characteristics;
comparing the one or more vehicle data points with a cue range stored in the memory hardware;
outputting, based on the comparison of the one or more vehicle data points with the cue range, the positive cue of the audible cue application via a speaker system of the vehicle;
monitoring the one or more vehicle data points; and
modifying the positive cue based on the monitored one or more vehicle data points.

2. The audible cue system of claim 1, wherein outputting the positive cue includes outputting, continuously, the positive cue when the one or more vehicle data points are within the cue range.

3. The audible cue system of claim 1, wherein modifying the positive cue includes altering at least one of the cue characteristics, the positive cue including a first audible pattern.

4. The audible cue system of claim 3, further including issuing a reminder in response to the monitored one or more vehicle data points, the reminder including a positive reminder cue having a second audible pattern.

5. The audible cue system of claim 4, wherein issuing the reminder includes identifying a trend relative to the cue range and issuing the reminder when the identified trend is trending towards the cue range.

6. The audible cue system of claim 4, wherein the second audible pattern is faster than the first audible pattern.

7. The audible cue system of claim 1, wherein outputting the positive cue includes increasing a volume of the positive cue at a first rate to a predetermined volume.

8. The audible cue system of claim 7, wherein modifying the positive cue includes decreasing the volume of the positive cue at a second rate, the second rate being greater than the first rate.

9. A computer-implemented method when executed by data processing hardware causes the data processing hardware to perform operations comprising:

receiving, at a first electronic control unit (ECU), one or more vehicle data points;

executing, by the first ECU, an audible cue application configured with a positive cue and cue characteristics;

comparing the one or more vehicle data points with a cue range;

outputting, based on the comparison of the one or more vehicle data points with the cue range, the positive cue from the audible cue application via a speaker system of the vehicle;

monitoring the one or more vehicle data points; and modifying the positive cue based on the monitored one or more vehicle data points.

10. The method of claim 9, wherein outputting the positive cue includes projecting, continuously, the positive cue when the one or more vehicle data points are within the cue range.

11. The method of claim 9, wherein modifying the positive cue includes altering at least one of the cue characteristics, the positive cue including a first audible pattern.

12. The method of claim 11, further including issuing a reminder in response to the monitored one or more vehicle data points, the reminder including a positive reminder cue having a second audible pattern.

13. The method of claim 12, wherein issuing the reminder includes identifying a trend relative to the cue range and issuing the reminder when the identified trend is trending towards the cue range.

14. The method of claim 12, wherein the second audible pattern is faster than the first audible pattern.

15. The method of claim 9, wherein outputting the positive cue includes increasing a volume of the positive cue at a first rate to a predetermined volume.

16. The method of claim 15, wherein modifying the positive cue includes decreasing the volume of the positive cue at a second rate, the second rate being greater than the first rate.

17. An audible cue system for a vehicle, the audible cue system comprising:

data processing hardware; and memory hardware in communication with the data processing hardware, the memory hardware storing instructions that when executed on the data processing hardware cause the data processing hardware to perform operations comprising:

receiving, at a first electronic control unit (ECU), one or more vehicle data points;

executing, by the first ECU, an audible cue application configured with a positive cue and cue characteristics;

comparing the one or more vehicle data points with a cue range stored in the memory hardware; and outputting, based on the comparison of the one or more vehicle data points with the cue range, the positive cue from the audible cue application via a speaker system of the vehicle.

18. The audible cue system of claim 17, further including monitoring the one or more vehicle data points and modifying the positive cue based on the monitored one or more vehicle data points.

19. The audible cue system of claim 17, further including issuing a reminder in response to the monitored one or more vehicle data points being outside of the cue range.

20. The audible cue system of claim 17, wherein the one or more vehicle data points includes at least one of a speed of the vehicle, a state of charge of a battery, environmental controls of the vehicle, power usage of the battery, acceleration of the vehicle, deceleration of the vehicle, gravitational force of the vehicle in at least one direction, and a following distance of the vehicle.

\* \* \* \* \*